United States Patent [19]
Kubota et al.

[11] Patent Number: 5,813,228
[45] Date of Patent: Sep. 29, 1998

[54] CARRIER VEHICLE EQUIPPED WITH A SWING TABLE

[75] Inventors: Yorimichi Kubota; Katsuo Nagao, both of Tokyo; Yoshio Hamada, Kobe; Kazuo Takahashi; Masanori Hayashi, both of Hyogo-ken, all of Japan

[73] Assignee: Shin Caterpillar Mitsubishi Ltd., Tokyo, Japan

[21] Appl. No.: 622,661

[22] Filed: Mar. 26, 1996

[30] Foreign Application Priority Data

Mar. 29, 1995 [JP] Japan .................................. 7-070301
Aug. 24, 1995 [JP] Japan .................................. 7-215542

[51] Int. Cl.$^6$ ................................................. F16D 31/02
[52] U.S. Cl. ........................... 60/454; 60/456; 92/153; 180/327; 475/83; 475/159
[58] Field of Search ................. 60/456, 454; 92/153; 180/6.6, 9.23, 326, 327, 329; 475/83, 159, 337; 410/1; 182/65.1, 66.1, 66.2, 67.1, 67.2, 67.3, 67.4, 67.5; 105/28; 254/421

[56] References Cited

U.S. PATENT DOCUMENTS

| | | | |
|---|---|---|---|
| 986,588 | 3/1911 | O'Kelly | 475/337 |
| 2,170,951 | 8/1939 | Perry | 475/159 |
| 3,452,612 | 7/1969 | Casey | 475/337 |
| 3,568,778 | 3/1971 | Swisher et al. | 180/327 |
| 3,739,652 | 6/1973 | Caldwell et al. | 74/421 |
| 4,036,377 | 7/1977 | Weber | 254/421 |
| 5,440,951 | 8/1995 | Okada et al. | 475/159 |

FOREIGN PATENT DOCUMENTS 0313759  3/1989  Germany .................. F41F 21/14

OTHER PUBLICATIONS

Tech. Mitt. Krupp/Werksberichte, vol. 36, No. 1, May 1978, ESSEN, pp. 17–21, XP002006126 W. Rixen: "Transportraupen für Schwerlasten" p. 19, right–hand column, line 5–7; figures 1,2.

Machine Design, vol. 90, No. 9 21 Apr. 1988, Cleveland, Ohio, USA, pp. 131–137 XP002006127 David Parker: "Differential Gearings".

Primary Examiner—F. Daniel Lopez
Attorney, Agent, or Firm—Millen, White, Zelano, & Branigan, P.C.

[57] ABSTRACT

A carrier vehicle having a swing table supported on an under-carriage so as to swing a full turn, and a planetary reduction gear for reducing the revolution of a drive motor and transmitting it to the swing table. The planetary reduction gear is mounted on the under-carriage under the swing table.

4 Claims, 7 Drawing Sheets

CARRIER VEHICLE EQUIPPED WITH A SWING TABLE

FIELD OF THE INVENTION

The present invention relates to a novel carrier vehicle equipped with a swing table that is supported on an under-carriage to freely swing over a full turn, and that is used as a bed for carrying loads.

DESCRIPTION OF THE PRIOR ART

A construction machine such as hydraulic excavator has heretofore been known and has been widely put into practical use. The construction machine is equipped with an under-carriage, a swing table supported on the under-carriage to freely swing and a planetary reduction gear which reduces the revolution of the hydraulic motor and transmits it to the swing table. The planetary reduction gear is equipped with an input shaft which is the drive shaft of a hydraulic motor, an output shaft, and a planetary reduction gear means interposed between the input shaft and the output shaft, and is mounted on the swing table in a manner that the input shaft is positioned on the upper side and the output shaft is positioned on the lower side. A pinion gear is attached to the lower end of the output shaft, a ring gear is secured to an under-carriage frame that is mounted on the under-carriage, and the pinion gear is in mesh with the ring gear.

More concretely, the under-carriage is equipped with the under-carriage frame, and the swing table is supported via a swing bearing on the under-carriage frame to freely swing. The swing bearing includes an inner race secured onto the under-carriage frame and an outer race which is supported by the inner race to freely rotate and which firmly supports the swing table. The ring gear is formed along the inner periphery of the inner race. A housing is secured at its lower ends on the swing table in a manner to upwardly protrude on the swing table, and a hydraulic motor is mounted on the upper end of the housing. The input shaft is so disposed as to protrude from the upper end of the housing toward the lower inner side thereof. The output shaft is supported by two bearings at a lower part of the housing to freely rotate. The pinion gear of the output shaft is so arranged as to downwardly protrude from the lower end of the housing. The planetary reduction gear means includes a first-stage planetary gear mechanism and a second-stage planetary gear is mechanism. The first-stage planetary gear mechanism includes a first-stage sun gear drivably coupled to the input shaft, and a first-stage carrier for supporting a plurality of first-stage planetary gears that are in mesh with the first-stage sun gear and a first-stage ring gear formed along the inner peripheral surface of the housing. The second-stage planetary gear mechanism includes a second-stage sun gear drivably coupled to the first-stage carrier and a second-stage carrier for supporting a plurality of second-stage planetary gears that are in mesh with the second-stage sun gear and a second-stage ring gear formed along the inner peripheral surface of the housing. The second-stage carrier is drivably coupled to the upper end of the output shaft.

The revolution of the input shaft that is driven by the hydraulic motor is transmitted to the output shaft upon being reduced in two stages through the first-stage planetary gear mechanism and the second-stage planetary gear mechanism. The pinion gear revolves while rotating along the ring gear secured to the under-carriage. Therefore, the swing table on which is mounted the planetary reduction gear having the above-mentioned constitution is allowed to swing over 360 degrees.

The planetary reduction gear has a cantilevered structure in which an end thereof is in mesh with, and supported by, the upper turning body via the pinion gear and the ring gear. The housing of the planetary reduction gear is secured at the lower portions thereof onto the swing table in a manner to upwardly protrude almost entirely on the swing table. When it is attempted to use the upper surface of the swing table as a bed for carrying loads, therefore, the planetary reduction gear hinders the effective use of the upper surface as an area for carrying loads, though this problem may not arouse when the vehicle is used as the hydraulic excavator.

SUMMARY OF THE INVENTION

The object of the present invention is to provide a novel carrier vehicle equipped with a swing table which is supported on an under-carriage to freely swing thereon and which can be favorably utilized as a bed for carrying loads.

According to the present invention, there is provided a carrier vehicle which comprises an under-carriage, a swing table supported on said under-carriage to swing over a full turn, and a planetary reduction gear for reducing the revolution of the drive motor and transmitting it to said swing table, wherein said planetary reduction gear is mounted on said under-carriage under said swing table. This constitution is a first feature of the present invention.

According to the present invention constituted as described above, the substantially whole upper surface of the swing table can be effectively used as a space of the bed for carrying loads.

According to the present invention, in addition to the constitution having the above-mentioned first feature, there is provided a carrier vehicle, wherein said planetary reduction gear includes an input shaft driven by said drive motor, an output shaft and a planetary reduction gear means interposed between said input shaft and said output shaft, and is mounted on said under-carriage in a manner that said output shaft is positioned on the upper side thereof, and wherein a pinion gear is attached to an upper end of said output shaft, a ring gear is secured on the lower side of said swing table, and said pinion gear is in mesh with said ring gear. This constitution is a second feature of the present invention.

According to the present invention, the planetary reduction gear is mounted on the under-carriage in a manner as described above and is disposed under the swing table. Unlike the conventional vehicles, therefore, the planetary reduction gear does not protrude above the swing table. Accordingly, the substantially whole upper surface of the swing table can be effectively utilized as space of the bed for carrying loads.

According to the present invention, in addition to the constitution having the above-mentioned second feature, there is provided a carrier vehicle, wherein:

said under-carriage has an under-carriage frame, said swing table is supported via a swing bearing on said under-carriage frame to freely swing thereon, said swing bearing includes an outer race secured onto said under-carriage frame and an inner race that is supported by said outer frame to freely rotate and firmly supports said swing table, and said inner race has a ring gear formed along the inner peripheral portion thereof;

said planetary reduction gear has a housing which is secured at its upper end portions to said under-carriage frame in a manner to downwardly protrude beneath said under-carriage frame, said drive motor is fitted to the lower surface side of a lower end wall of said housing, said input shaft is positioned to penetrate through said lower end wall, said output shaft is supported at an upper portion in said housing by bearing means to freely rotate, and said pinion gear of said output shaft is so disposed as to upwardly protrude beyond the upper end of said housing;

said planetary reduction gear means includes a first-stage planetary gear mechanism and a second-stage planetary gear mechanism, said first-stage planetary gear mechanism includes a first-stage sun gear and a first-stage carrier for supporting a plurality of first-stage planetary gears that are in mesh with said first-stage sun gear and with a first-stage ring gear formed along the inner peripheral surface of said housing, and said second-stage planetary gear mechanism includes a second-stage sun gear drivably coupled to said first-stage carrier and a second-stage carrier for supporting a plurality of second-stage planetary gears that are in mesh with said the second-stage sun gear and with a second-stage ring gear formed along the inner peripheral surface of said housing;

said housing is provided with a support portion positioned under said first-stage carrier which is supported, via a thrust bearing means, by said support unit to rotate relative thereto;

said input shaft is supported, via a bearing means, by said lower end wall of said housing to freely rotate and is further supported by a support means in a manner that it is not allowed to move downwardly, said first-stage sun gear is supported in a manner that it is not permitted to rotate relative to said input shaft and that it is not permitted to move downwards, and said second-stage sun gear is supported by said first-stage sun gear via a thrust bearing means so as to rotate relative thereto;

said second-stage carrier is coupled to the lower end of said output shaft so as not to be permitted to rotate relative thereto and is further supported to rotate relative to said second-stage sun gear via the thrust bearing means interposed between the lower end of said output shaft and said second-stage sun gear;

an oil seal is interposed between the input shaft and said lower end wall of said housing under said bearing means that supports said input shaft; and a breather is provided at an upper end of said housing. This constitution is a third feature of the present invention.

Owing to the above-mentioned constitution, the planetary gear reduction means including the first-stage sun gear, second-stage sun gear, first-stage carrier and second-stage carrier, is reliably prevented from downwardly moving due to its own weight and is held in the housing. An oil seal is interposed between the input shaft and the lower end wall of the housing under the bearing means that supports the input shaft. This reliably prevents the lubricating oil contained in the housing from leaking to the external side. Moreover, since the breather is provided at the upper end of the housing, the pressure of the air space in an upper portion of the housing is reliably prevented from rising. Owing to the above-mentioned favorable constitutions, the planetary reduction gear exhibits its function to a satisfactory degree in spite of the manner that the output shaft is mounted on the under-carriage so as to be positioned on the upper side, and the above-mentioned object of the present invention is reliably accomplished.

According to the present invention, in addition to the constitution having the above-mentioned first feature, furthermore, there is provided a carrier vehicle, wherein:

said drive motor is constituted by a hydraulic motor;

said planetary reduction gear includes an input shaft driven by said hydraulic motor, an output shaft, and a planetary reduction gear means interposed between said input shaft and said output shaft, and is mounted on said under-carriage in a manner that said output shaft is positioned on the upper side;

a pinion gear is attached to an upper end of said output shaft, a ring gear is secured on the lower side of said swing table, and said pinion gear is in mesh with said ring gear;

said hydraulic motor is driven as the operation fluid in an operation fluid tank is fed thereto by a hydraulic pump, and is equipped with a case that contains therein an operation fluid drain chamber;

said planetary reduction gear has a housing that includes an upper end wall and a lower end wall, said case of said hydraulic motor is fitted to the lower surface side of said lower end wall, and said input shaft is so positioned as to penetrate through said lower end wall;

said output shaft is supported at an upper portion in said housing via a bearing means so as to rotate and is so positioned as to penetrate through said upper end wall, said pinion gear is disposed above said upper end wall, and an oil seal is interposed between said output shaft and said upper end wall;

said input shaft is supported by said lower end wall via a bearing means so as to rotate;

the drain chamber in said case of said hydraulic motor is communicated with the interior of said housing via a fluid passage means; and the upper end of said housing is communicated with said operation fluid tank via a return fluid passage that includes an oil filter. This constitution is a fourth feature of the present invention.

According to the present invention, the substantially whole upper surface of the swing table can be effectively used as a space of the bed for carrying loads. In this constitution, a passage for circulating the operation fluid is formed among the drain chamber in the case of the hydraulic motor, housing of the planetary reduction gear and operation fluid tank. As the hydraulic motor starts rotating, the operation fluid in the drain chamber flows into the housing due to a rise in the pressure. After the housing is filled with the operation fluid, the operation fluid is returned back to the operation fluid tank. As a result, even the upper part of the housing where the air tends to stay is filled with the operation fluid. Therefore, the bearing means located at an upper part of the housing, oil seal and the like are sufficiently and reliably lubricated, and damage due to seizure is prevented. Accordingly, the planetary reduction gear reliably exhibits its function.

According to the present invention, in addition to the above-mentioned constitution having the fourth feature, there is provided a carrier vehicle, wherein:

an oil seal is interposed between said input shaft and said lower end wall under said bearing means that supports said input shaft, said oil seal having a communication hole penetrating therethrough in the up-and-down direction;

said case of said hydraulic motor has an upper end wall, said hydraulic motor has a drive shaft which is so positioned as to penetrate through said upper end wall and is supported by said upper end wall via a bearing means to rotate, the upper end of said drive shaft being drivably coupled to the lower end of said input shaft; and said fluid passage means includes said bearing means for supporting said input shaft and said output shaft, as well as said communication hole formed in said oil seal. This constitution is a fifth feature of the present invention.

According to the present invention, therefore, it is allowed to form the operation fluid circulation passage in a very simple constitution and at a reduced cost.

Inside the housing of the planetary reduction gear, there is produced dust such as worn-out powder of metals and metal pieces due to breakage of teeth at the time when the gears mesh, ends of gears slide, and bearings slide for extended periods of time.

While the hydraulic motor and the planetary reduction gear are in operation, the operation fluid continues to flow from the drain chamber of the hydraulic motor to the operation fluid tank via housing and return oil passage including the oil filter. Therefore, dust that is produced inside the housing, such as worn-out powder of metals and metal pieces, are removed by the oil filter provided in the return fluid passage.

While the hydraulic motor and the planetary reduction gear are at rest, the dust such as the worn-out powder of metals and metal pieces in the operation fluid fall down due to its own weight and precipitate on the lower portion of the housing. By suitably determining the inner diameter of the communication hole of the oil seal by taking into consideration the allowable size in the drain chamber of the hydraulic motor, it is made possible to prevent the dust from infiltrating into the drain chamber of the hydraulic motor.

Dust such as worn-out powder of metals is produced even in the drain chamber of the hydraulic motor. As the operation fluid circulates, however, dust of size not permitted to pass through the communication hole of the oil seal is prevented from entering into the housing, and dust of other sizes is recovered by the external oil filter. Accordingly, the rotating portions in the planetary reduction gear are reliably prevented from being damaged.

According to the present invention, in addition to the above-mentioned constitution having the fourth feature, furthermore, there is provided a carrier vehicle, wherein:

an oil filter is interposed between said input shaft and said lower end wall under said bearing means that supports said input shaft;

said case of said hydraulic motor has an upper end wall, said hydraulic motor has a drive shaft which is so positioned as to penetrate through said upper end wall and is supported by said upper end wall via bearing means so as to rotate, the upper end of said drive shaft being drivably coupled to the lower end of said input shaft; and said fluid passage means includes said bearing means that support said input shaft and said output shaft, as well as said oil filter. This constitution is a sixth feature of the present invention.

According to the present invention, it is allowed to very simply form the operation oil circulation passage at a very low cost.

Dust such as worn-out powder of metals is removed by the oil filter provided in the return fluid passage in a step in which the operation fluid is returned back to the operation fluid tank via housing and return oil passage. While the hydraulic motor and the planetary reduction gear are in operation, the operation fluid flows into the operation fluid tank from the drain chamber of the hydraulic motor via housing and return fluid passage which includes the oil filter. Therefore, dust such as worn-out powder of metals and metal pieces produced in the housing are removed by the oil filter provided in the return oil passage.

While the hydraulic motor and the planetary reduction gear are at rest, dust such as worn-out powder of metals and metal pieces in the operation fluid fall down due to their own weight and precipitate on the lower part of the housing, and can be removed by an oil filter provided between the input shaft and the lower end wall. Accordingly, the rotary portions in the planetary reduction gear are reliably prevented from being damaged.

Dust such as worn-out powder of metal is produced even in the drain chamber of the hydraulic motor. The dust, however, is removed while the operation fluid is circulating by the oil filter provided between the input shaft and the lower end wall and by an external oil filter. Accordingly, the rotary portions in the planetary reduction gear are reliably prevented from being damaged.

According to the present invention, in addition to the above-mentioned constitution having the fourth feature, there is further provided a carrier vehicle, wherein:

a first oil seal is interposed between said input shaft and said lower end wall under said bearing means that supports said input shaft;

said case of said hydraulic motor has an upper end wall, said hydraulic motor has a drive shaft which is so positioned as to penetrate through said upper end wall and is supported by said upper end wall via a bearing means so as to rotate, the upper end of said drive shaft being drivably coupled to the lower end of said input shaft, and a second oil seal is interposed between said drive shaft above said bearing means which supports said drive shaft and said upper end wall;

an annular fluid chamber is formed between said upper end wall and the outer peripheral surface of said drive shaft which is located between said bearing means supporting said drive shaft and said second oil seal, and a first fluid hole is formed in said upper end wall, one end of said first fluid hole opening in said fluid chamber and the other end of said first fluid hole opening on the outside of said case;

a second fluid hole is formed in said lower end wall of said housing, one end of said second fluid hole opening in said housing and the other end of said second fluid hole opening on the outside of said housing, said first fluid hole and said second fluid hole are connected together via a fluid pipe arranged on the outside of said casing and said housing, and an oil filter is arranged in said fluid pipe; and said fluid passage means includes said first fluid hole, said fluid pipe that includes said oil filter, and said second fluid hole. This constitution is a seventh feature of the present invention.

According to the present invention, the fluid passage linking the drain chamber of the hydraulic motor to the housing of the planetary reduction gear is disposed, together with the oil filter, on the outside of the case and the housing thereby to facilitate maintenance.

DETAILED DESCRIPTION OF THE PREFERRED EMBODIMENTS

Figure 1:
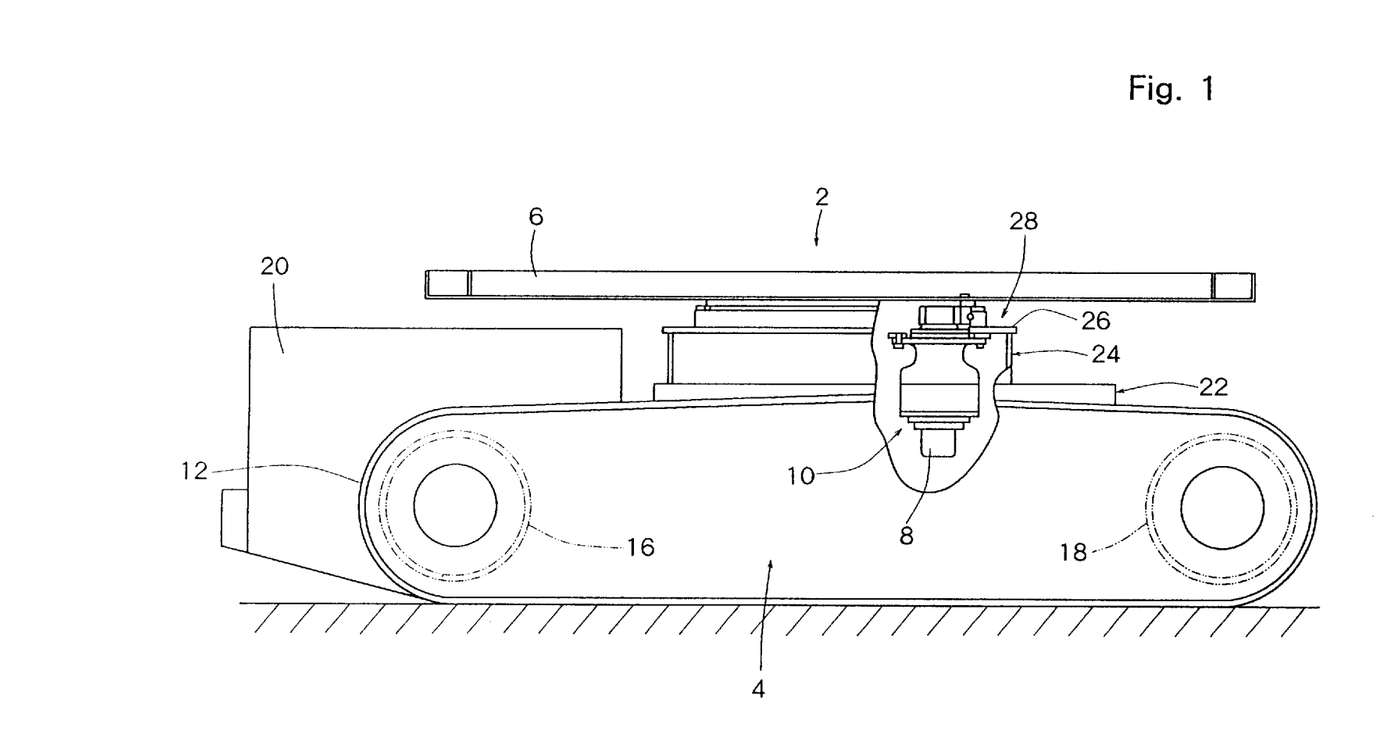
FIG. 1 is a side view schematically illustrating a carrier vehicle equipped with a swing table constituted according to an embodiment of the present invention.
Figure 2:
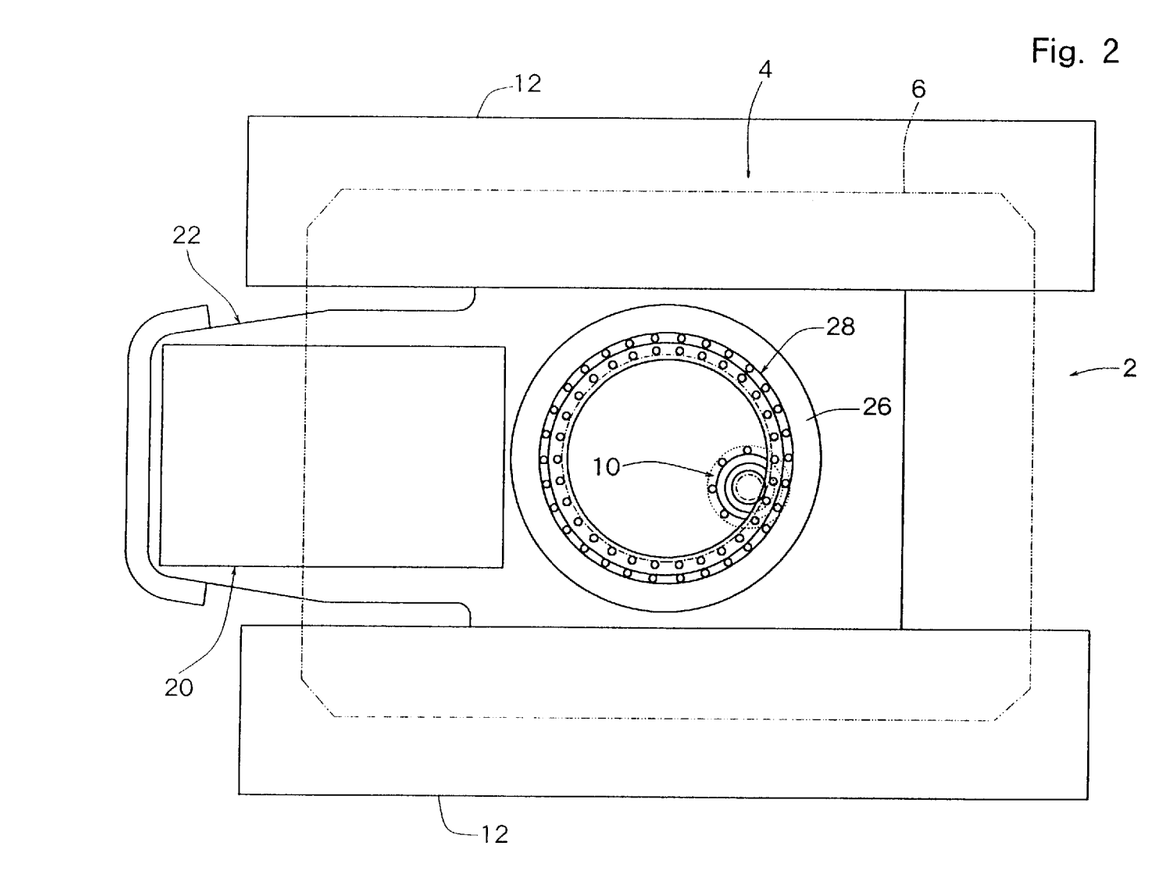
FIG. 2 is a schematic top view of FIG. 1.

A carrier vehicle equipped with a swing table constituted according to an embodiment of the present invention will now be described with reference to the accompanying drawings. Referring to FIGS. 1 and 2, a carrier vehicle 2 is equipped with an under-carriage 4, a swing table 6 supported on the under-carriage 4 to freely swing thereon, and a planetary reduction gear 10 which reduces the revolution of a hydraulic motor 8 that is a drive motor and transmits it to the swing table 6. The planetary reduction gear 10 is mounted on the under-carriage 4 under the swing table 6. This constitution will be described later in detail. The under-carriage 4 has crawlers 12 that are arranged on the right and left sides thereof, the crawlers 12 being wrapped around sprockets 16 provided at the rear right and left portions of the vehicle and idlers 18 provided at the front right and left portions of the vehicle. The crawlers 12 are driven as the sprockets 16 are driven by a running hydraulic motor that is not shown, to make the under-carriage 4 move in a predetermined direction. An engine 20 is mounted on the rear portion of the under-carriage 4. The engine 20 is a drive source for a variety of hydraulic devices inclusive of a hydraulic motor 8 and the running hydraulic motor.

Figure 3:
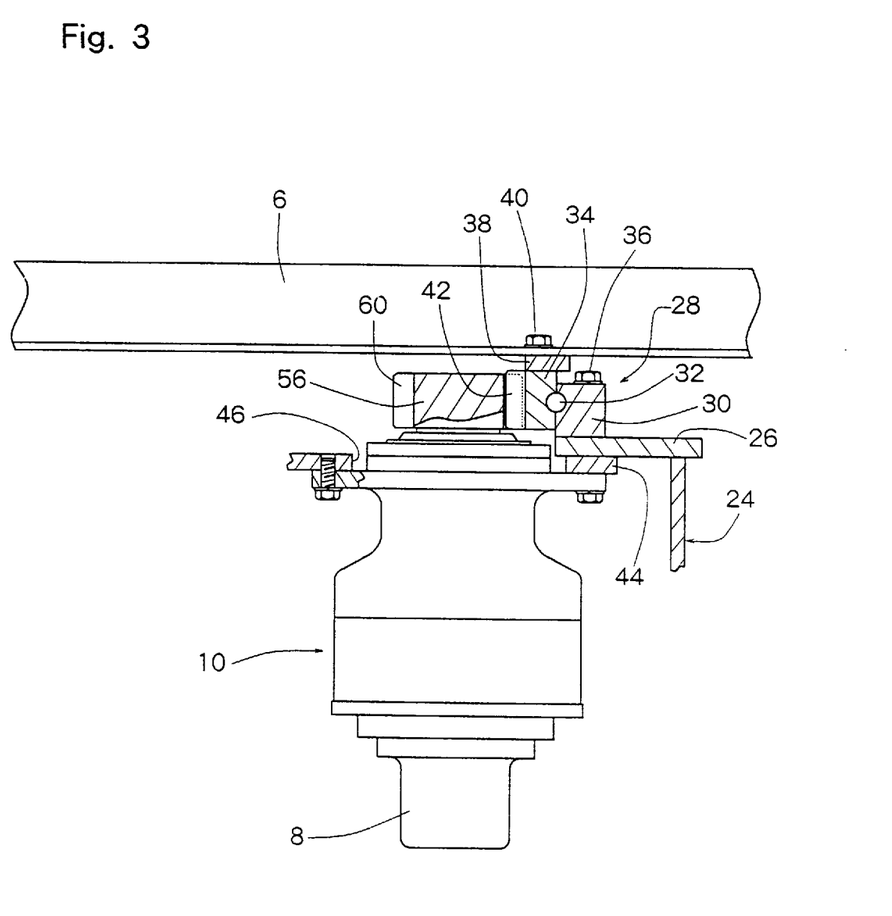
FIG. 3 is a view illustrating a portion of FIG. 1 on an enlarged scale.

Referring to FIG. 3 together with FIGS. 1 and 2, on the central portion of the under-carriage 4 is provided a support portion 24 that is part of the under-carriage frame 22, for supporting the swing table 6. The upper end of the support portion 24 is constituted by a ring-like support frame member 26 that is horizontally positioned. The swing table 6 is supported on the support frame member 26 of an under-carriage frame 22 via a swing bearing 28 to freely rotate thereon. The swing bearing 28 includes an outer race 30 and an inner race 34 which is supported by the outer race 30 via a plurality of balls 32 so as to rotate. The outer race 30 is secured to the support frame member 26 by a plurality of bolts 36. The swing table 6 is secured onto the inner race 34 by a plurality of bolts 40 via a ring-like spacer member 38. A ring gear (inner teeth) 42 is formed along the whole inner periphery of the inner race 34. Owing to the above-mentioned constitution, the swing table 6 is supported on the support portion 24 of the under-carriage frame 22 to swing over a full turn (to freely turn 360 degrees). In this embodiment, the swing table 6 has nearly a rectangular shape as viewed on a plane (see FIG. 2) and horizontally extends as a whole. The engine 20 is disposed,at a position lower than the locus of turn of the swing table 6 so as not to interfere the turn of the swing table 6 (see FIG. 1).

Figure 4:
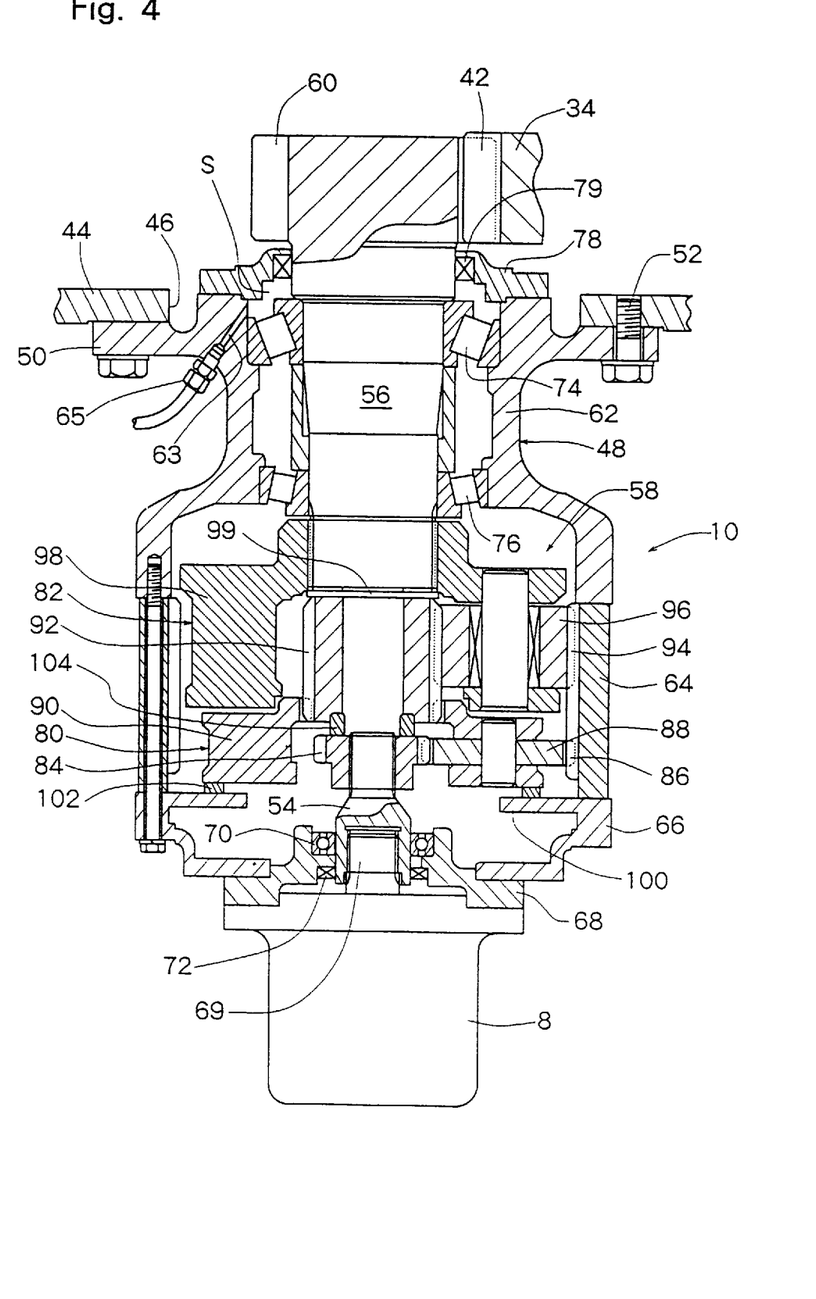
FIG. 4 is a sectional view illustrating major portions of FIG. 3 on an enlarged scale.

A disk-like support plate member 44 is secured to the lower side of the ring-like support frame member 26 in a manner to cover the hole thereof. A hole 46 is formed at the edge of the support plate member 44. Referring to FIG. 4, the planetary reduction gear 10 has a housing 48. At an upper end of the housing 48 is formed an annular flange 50 that protrudes outwardly in a radial direction. The annular flange 50 of the housing 48 is secured to the support plate member 44 on the lower side of the hole 46 using a plurality of bolts 52, whereby the upper end of the housing 48 is secured in a manner that most part of the planetary reduction gear 10 downwardly protrudes below the support plate member 44.

The planetary reduction bear 10 includes an input shaft 54 driven by the hydraulic motor 8 which is a drive motor, an output shaft 56, and a planetary reduction gear means 58 interposed between the input shaft 54 and the output shaft 56, and is so mounted on the support plate member 44 that the input shaft 54 is positioned on the lower side and the output shaft 56 is positioned on the upper side. A pinion gear 60 is attached to the upper end of the output shaft 56 as a unitary structure, and is in mesh with the ring gear 42. In further detail, the housing 48 includes an upper housing 62, an intermediate housing 64 fitted to the lower end of the upper housing 62, and a lower cover 66 fitted to the lower end of the intermediate housing 64. The hydraulic motor 8 is fitted to the lower cover 66 via a support plate 68 which defines the lower end wall of the housing 48; i.e., the hydraulic motor 8 is fitted to the side of the lower surface thereof. An assembly of the planetary reduction gear 10 and the hydraulic motor 8 constitutes a swing reduction unit. The support plate 68 also serves as a partitioning wall between the housing 48 and the hydraulic motor 8. To the upper end of a drive shaft 69 of the hydraulic motor 8 is spline-coupled the lower end of the input shaft 54 (input shaft 54 has a female spline as shown). The input shaft 54 is so positioned as to penetrate through the support plate 68, and is supported by the support plate 68 through a bearing 70 (which constitutes a bearing means) to freely rotate. A stepped portion is formed in the inner periphery at the lower end of the input shaft 54, and a stepped portion of a large diameter is formed at the lower end of the spline of the drive shaft 69, the stepped portion of the input shaft 54 being supported by the stepped portion of the drive shaft 69. Therefore, the input shaft 54 is prevented from downwardly moving due to its own weight by the friction relative to the inner race of the bearing 70 (this portion is forcibly inserted) and by being supported by the stepped portion. The bearing 70, stepped portion of the input shaft 54 and stepped portion of the drive shaft 69 constitute a support means that blocks the input shaft 54 from downwardly moving. An oil seal 72 is interposed between the input shaft 54 and the support plate 68 under the bearing 70. This prevents the leakage of the lubricating oil from between the input shaft 54 and the support plate 68.

The output shaft 56 is supported in the upper housing 62 by two bearings 74 and 76 (which constitute bearing means) in a manner to freely rotate and to be prevented from downwardly moving. On the upper end of the upper housing 62 is mounted an upper cover 78 that defines the upper end wall. The pinion gear 60 provided at the upper end of the output shaft 56 is so disposed as to upwardly protrude beyond the upper cover 78. An oil seal 79 is interposed between the output shaft 56 and the upper cover 78. This prevents the leakage of the lubricating oil from between the output shaft 56 and the upper cover 78. Space S is formed in an upper part of the upper housing 62, it being surrounded by the upper housing 62, bearing 74, output shaft 56 and upper cover 78. The space S is a region that is not filled with the lubricating oil and hence, forms an air space. A ventilating hole 63 is formed in an upper part of the upper housing 62. One end of the ventilating hole 63 is opened in the space S and the other end thereof is connected to an end of a breather 65. The other end (not shown) of the breather 65 is opened in the open air. The other opening end of the breather 65 is located to be higher than the space S in order to prevent the leakage of the lubricating oil.

The planetary reduction gear 58 includes a first-stage planetary gear mechanism 80 and a second-stage planetary gear mechanism 82. The first-stage planetary gear mechanism 80 has a first-stage sun gear 84 that is supported by being spline-coupled to the input shaft 54 so will not to move downwards, and a first-stage carrier 90 for supporting a plurality of first-stage planetary gears 88 that are in mesh with the first-stage sun gear 84 and with a first-stage ring gear 86 formed along the inner peripheral surface of the intermediate housing 64. The second-stage planetary gear mechanism 82 has a second-stage sun gear 92 drivably coupled to the first-stage carrier 90, and a second-stage carrier 98 for supporting a plurality of second-stage planetary gears 96 that are in mesh with the second-stage sun gear 92 and with a second-stage ring gear 94 formed along the inner peripheral surface of the intermediate housing 64. The second-stage carrier 98 is spline-coupled to the lower end of the output shaft 56. The first-stage ring gear 86 and the second-stage ring gear 94 are formed as a unitary structure. The first-stage carrier 90 and the second-stage sun gear 92 may be spline-coupled together. The second-stage carrier 98 is spline-coupled to the lower end of the output shaft 56 so as not to rotate relative thereto, and is so supported as to freely rotate relative to the second-stage sun gear 92 by a thrust washer 99 (constituting a thrust bearing means) that is interposed between the lower end of the output shaft 56 and the upper end of the second-stage sun gear 92. Thus, the second-stage carrier 98 is so supported as will not move downwards due to its own weight relative to the second-stage sun gear 92, and is prevented from seizure that results from a difference in the revolution.

The lower cover 66 is provided with a support portion 100 that is located under the first-stage carrier 90. The support portion 100 is so formed as to horizontally and inwardly protrude from the lower cover 66 in a radial direction. A thrust washer (constituting a thrust bearing means) 102 is interposed between the upper surface of the support portion 100 and the lower surface of the first-stage carrier 90. Therefore, the first-stage carrier 90 is supported by the support portion 100 via the thrust washer 102 to be allowed to rotate relative thereto. Thus, the first-stage carrier 90 is prevented from downwardly moving due to its own weight, and is further prevented from seizure caused by the sliding. A thrust washer (constituting a thrust bearing means) 104 is interposed between the lower surface of the second-stage sun gear 92 and the upper surface of the first-stage sun gear 84. Therefore, the second-stage sun gear 92 is supported by the first-stage sun gear 84 via the thrust water 104 so as to be allowed to rotate relative thereto. Thus, the second-stage sun gear 92 is prevented from downwardly moving due to its own weight, and is further prevented from seizure caused by the sliding. The weights of the second-stage carrier 98, second-stage sun gear 92 and first-stage sun gear 84 are finally supported by the input shaft 54.

As will be apparent from the above-mentioned constitution, the planetary reduction gear 10 is mounted on the under-carriage 4 and is disposed on the lower side of the swing table 6. Therefore, the swing table 6 that is supported on the under-carriage 4 so as to freely swing 360 degrees, permits the substantially whole upper surface thereof to be used as a bed for carrying loads. It is therefore desired that the carrier vehicle 2 is used as a vehicle that can be remotely controlled by a known means. By operating the engine 20, the carrier vehicle 2 runs via the crawlers 12. With the engine 20 being driven, the pressurized fluid blown by a known hydraulic pump is fed to the hydraulic motor 8 to rotate the input shaft 54 via the drive shaft 69. The revolution of the input shaft 54 is transmitted to the output shaft 56 being reduced in two stages through the first-stage planetary gear mechanism 80 and the second-stage planetary gear mechanism 82. Thereby, the pinion gear 60 drives the ring gear 42, so that the swing table 6 turns in a predetermined direction.

Downward movements of the first-stage planetary gear mechanism 80 and the second-stage planetary gear mechanism 82 due to their own weights are reliably prevented by the input shaft 54 supported by the bearing 70, first-stage sun gear 84 supported by the input shaft 54, thrust washer 104 interposed between the first-stage sun gear 84 and the second-stage sun gear 92, thrust washer 99 interposed between the second-stage carrier 98 and the second-stage sun gear 92, support portion 100, and thrust washer 102 interposed between the support portion 100 and the first-stage carrier 90. The lubricating oil contained in the housing 48 is reliably prevented from leaking to the outer side by the oil seals 72 and 79. The space S is formed in an upper part of the housing 48. The space S (air space) is open to the atmosphere through the ventilation hole 63 and breather 65, and the internal pressure is prevented from rising.

Figure 5:
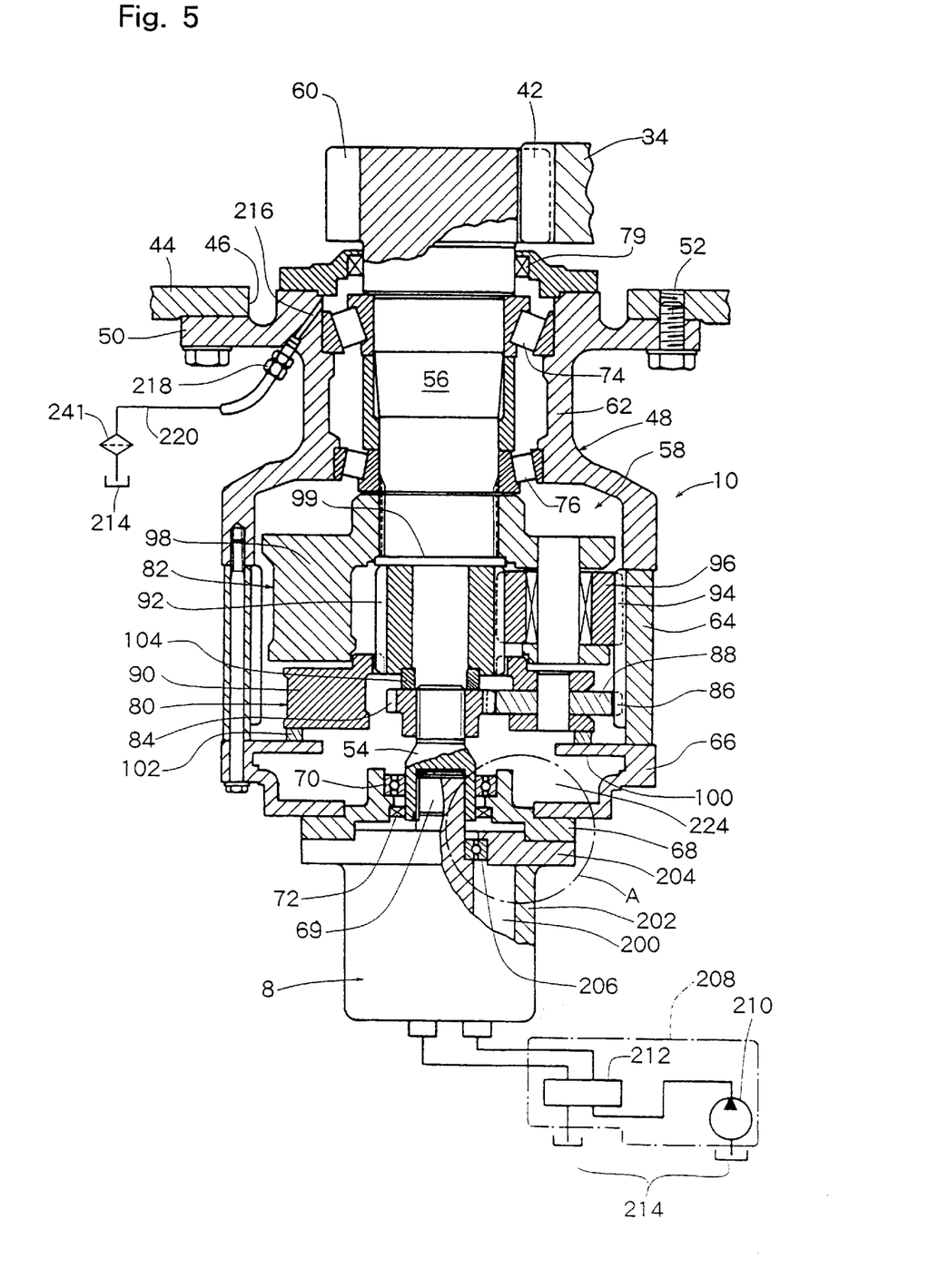
FIG. 5 is a sectional view illustrating a swivel reduction unit constituted according to another embodiment of the present invention.
Figure 6:
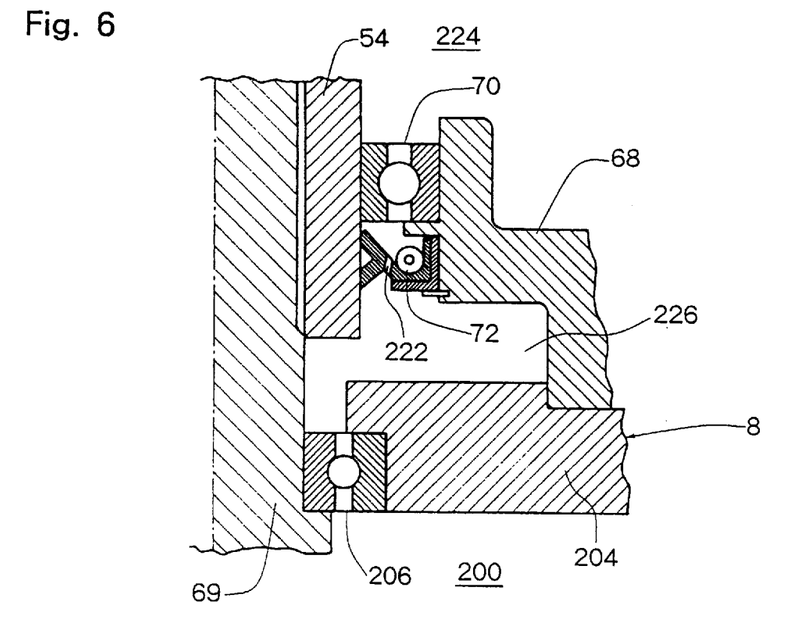
FIG. 6 is a view illustrating a portion A of FIG. 5 on an enlarged scale.

The swing reduction unit mounted on the carrier vehicle 2 according to other embodiments will be described next with reference to FIGS. 5 to 8, wherein the same portions as those of FIGS. 1 to 4 are denoted by the same reference numerals and their description is not repeated. Referring to FIGS. 5 and 6., the hydraulic motor 8 is provided with a case 202 having an operation oil drain chamber 200. The case 202 has an upper end wall 204 which is fitted to the support plate 68, so that the hydraulic motor 8 is detachably attached to the housing 48. As described earlier, the assembly of the planetary reduction gear 10 and the hydraulic motor 8 constitutes a swing reduction unit. The drive shaft 69 of the hydraulic motor 8 is so positioned as to penetrate through the upper end wall 204 and is supported by the upper end wall 204 via a bearing 206 (constituting a bearing means) so as to be allowed to rotate.

Reference numeral 208 denotes a conventionally known hydraulic unit which is mounted on the carrier vehicle 2. The hydraulic unit 208 includes a hydraulic pump 210 driven by the engine 20, a control valve 212 of the hydraulic motor 8, an operation fluid tank 214, etc. By manipulating a hydraulic motor operation lever that is not shown, the control valve 212 is changed over, the operation fluid in the operation fluid tank 214 is fed by the hydraulic pump 210 to the hydraulic motor 8 which is then driven. An oil hole 216 is formed at an upper end of the upper housing 62, and an oil port 218 is fitted to the oil hole 216. The oil port 218 is communicated with the operation fluid tank 214 through a return fluid passage 220 which is provided with an oil filter 241. The oil filter 241 may be provided in the operation fluid tank 214 as a matter of course. Referring to FIG. 6, a communication hole 222 that penetrates through in the up-and-down direction is formed in the oil seal 72. The drain chamber 200 and space 224 in the housing 48 are communicated with each other through bearing 206, space 226, communication hole 222 in the oil seal 72 and bearing 70, that constitute a fluid passage means.

Owing to the above-mentioned constitution, an operation fluid circulation passage is formed among the drain chamber 200 of the hydraulic motor 8, housing 48 of the planetary reduction gear 10 and operation fluid tank 214. As the hydraulic motor 8 is actuated, the operation fluid in the drain chamber 200 flows into space 224 in the housing 48 through the fluid passage due to a rise in the pressure, and the pressure of the operation fluid filled in the housing 48 is increased. The operation fluid in the housing 48 is returned back to the operation fluid tank 214 through fluid hole 216, fluid port 218, return fluid passage 220 and oil filter 241. As a result, even the uppermost part in the housing 48 where the air tends to stay is filled with the operation fluid and hence, the bearing 74 and the oil seal 79 located at the upper end of the housing 48 are lubricated sufficiently and reliably and are not damaged by seizure. Accordingly, the planetary reduction gear 10 reliably exhibits its function.

Figure 7:
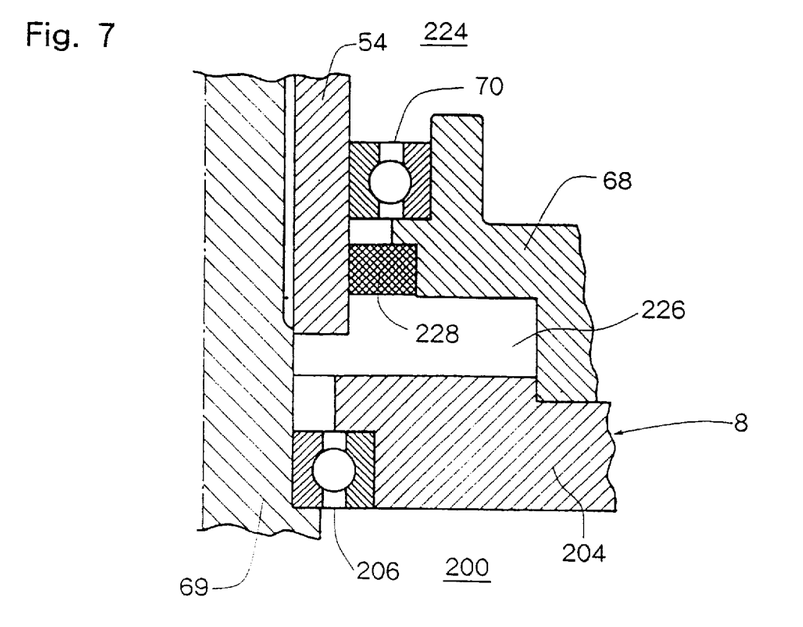
FIG. 7 is a view illustrating the portion A of FIG. 5 according to a further embodiment.

Described below with reference to FIG. 7 is a further embodiment of the fluid passage means. An oil filter 228 is interposed between the support plate 68 and the input shaft 54 under the bearing 70 that supports the input shaft 54. The drain chamber is 200 is communicated with the space 224 in the housing 48 via bearing 206, space 226, oil filter 228 and bearing 70, that constitute the fluid passage means. According to this constitution, it is allowed to form the operation fluid circulation passage very simply and at a reduced cost. Moreover, dust such as worn-out powder of metals that is produced in the operation fluid in the planetary reduction gear 10 and that falls due to its own weight when the operation is halted, is removed by the oil filter 228 and does not infiltrate into the drain chamber 200 of the hydraulic motor 8. Besides, dust such as worn-out powder of metals that is produced in the operation fluid in the drain chamber 200 of the hydraulic motor 8 is removed by the oil filter 228 and does not infiltrate into the housing 48 during the operation. Accordingly, rotary portions of the planetary reduction gear 10 are reliably prevented from being damaged.

Figure 8:
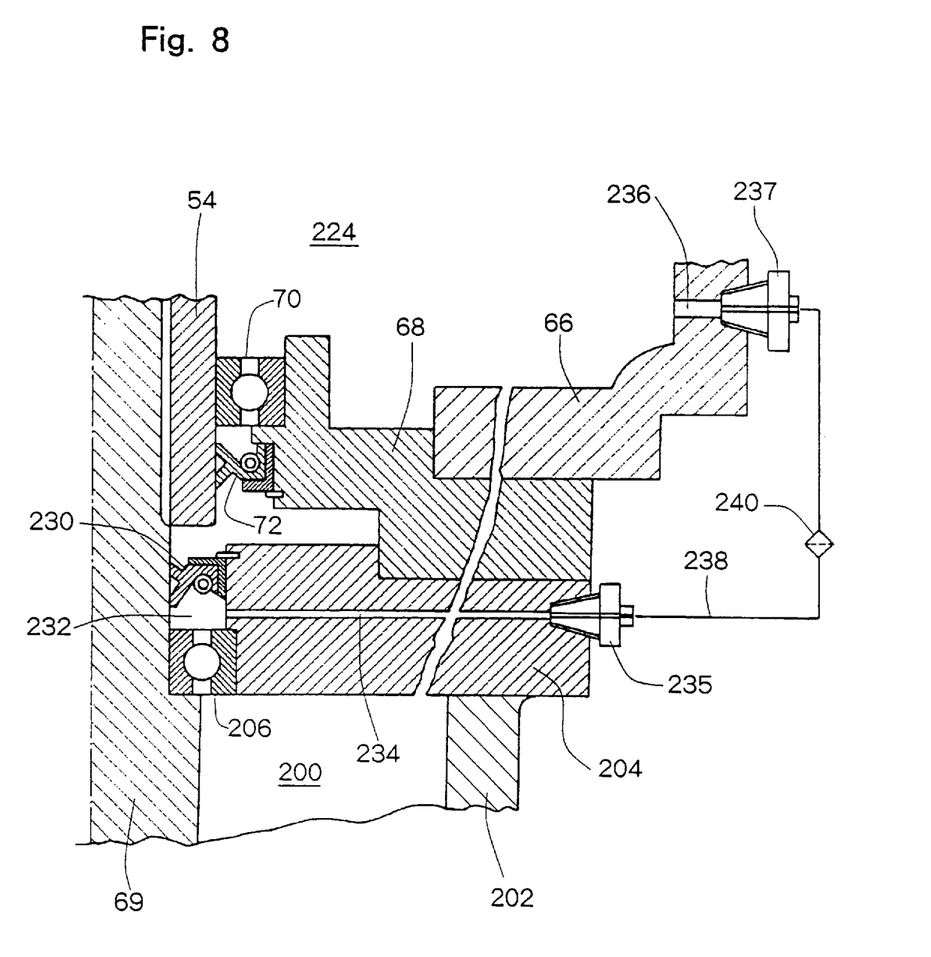
FIG. 8 is a view illustrating the portion A of FIG. 5 according to a still further embodiment of the present invention.

Described below with reference to FIG. 8 is a still further embodiment of the fluid passage means. A second oil seal 230 is interposed between the drive shaft 69 and the upper end wall 204 above the bearing 206 that supports the drive shaft 69. In this embodiment, the above-mentioned oil seal 72 defines the first oil seal. An annular fluid chamber (space) 232 is formed between the upper end wall 204 and the outer peripheral surface of the drive shaft 69 which is located between the second oil seal 230 and the bearing 206 that supports the drive shaft 69. In the upper end wall 204 is formed a first fluid hole 234 which is opened at its one end in the fluid chamber 232 and is opened at its other end to the outside of the upper end wall 204 (i.e., case 202). An operation fluid blow-out port 235 is fitted to the is opening on the outside of the first fluid hole 234. In the lower cover 66 of the housing 48 is formed a second fluid hole 236 which is opened at its one end to space 224 in the housing 48 and is opened at its other end to the outside of the housing 48. An operation fluid introduction port 237 is fitted to the opening to the outside of the second fluid hole 236. The first fluid hole 234 and the second fluid hole 236 are connected together through a fluid pipe 238 disposed on the outer side of the case 202 and the housing 48. An oil filter 240 is arranged in the fluid pipe 238. The drain chamber 200 is communicated with space 224 in the housing 48 through bearing 206, fluid chamber 232, first fluid hole 234, operation fluid blow-out port 235, fluid pipe 238 including the oil filter 240, operation fluid introduction port 237 and second fluid hole 236, that constitute the fluid passage means. According to this constitution, the fluid pipe 238 (defining the fluid passage) that communicates the drain chamber 200 in the hydraulic motor 8 with the housing 48 of the planetary reduction gear 10, is disposed, together with the oil filter 240, on the outer side of the case 202 and the housing 48, thereby facilitating the maintenance.

According to the present invention as will be easily understood from the foregoing description, the planetary reduction gear 10 reliably exhibits its function to a sufficient degree in spite of its upside down mounting, as compared with the conventional manner of mounting. It is therefore allowed to effectively utilize the upper surface of the swing table 6 without any problem such as seizure or damage to the upper portions to which the lubricating oil is less supplied.

In the foregoing was described a carrier vehicle equipped with a swing table by way of embodiments of the present invention. It should, however, be noted that the invention is in no way limited to the above-mentioned embodiments only but can be changed and modified in a variety of other ways without departing from the scope of the invention. In the above-mentioned embodiments, for instance, the lower cover 66 and the support plate 68 are separately formed, which, however, may be formed as a unitary structure to constitute the lower end wall of the housing 48. It is further allowable to use thrust bearings in place of the thrust washers 102 and 104. In the above-mentioned embodiments, the support means for preventing the input shaft 54 from downwardly moving is constituted by the bearing 70 and a stepped portion of the drive shaft 69. The invention, however, is in no way limited to this constitution only. For instance, there can be contrived a constitution in which an annular flange is formed on the input shaft 54 to outwardly protrude in a radial direction, and the lower surface of the annular flange is supported by the upper surface of the inner race of the bearing 70. According to this constitution, the input shaft 54 is prevented by the bearing 70 only from moving downwards, and hence, there is no need to form a stepped portion in the drive shaft 69. In the above-mentioned embodiments, furthermore, the first-stage sun gear 84 is supported by being spline-coupled to the input shaft 54 so will not to move downwards. That is, the input shaft 54 is prevented from moving downwards as the lower end of the female spline of the first-stage sun gear 84 reaches the lower edge of the male spline of the input shaft 54. Instead of this constitution, an annular flange that outwardly protrudes in a radial direction may be formed under the spline portion of the input shaft 54, and the lower end of the first-stage sun gear 84 may be supported by the upper surface of the annular flange.

According to the present invention, the substantially whole upper surface of the swing table that is supported on the under-carriage to freely swing can be effectively used as space of a bed for carrying loads, making it possible to provide a carrier vehicle equipped with the swing table that can be favorably used as a bed for carrying loads.

What we claim is:

1. A carrier vehicle comprising an under carriage, a swing table supported on said undercarriage to swing over a full turn, a drive motor, and a planetary reduction gear for reducing the revolution of said drive motor and transmitting it to said swing table, wherein said planetary reduction gear is mounted on said under-carriage under said swing table;

wherein said drive motor is constituted by a hydraulic motor;

said planetary reduction gear includes an input shaft driven by said hydraulic motor, an output shaft, and a planetary reduction gear means interposes between said input shaft and said output, and is mounted on said under-carriage in a manner that said output shaft is positioned on the upper side;

a pinion gear is attached to an upper end of said output shaft, a ring gear is secured on the lower side of said swing table, and said pinion gear is in mesh with said ring gear;

said hydraulic motor is driven as operation fluid in anoperation fluid tank is fed thereto by a hydraulic pump, and is equipped with a case that contains therein an operation fluid drain chamber;

said planetary reduction gear has a housing that includes an upper end wall and a lower end wall, said case of hydraulic motor is fitted to the lower surface side of said lower end wall, said case of said hydraulic motor is fitted to the lower surface side of said lower end wall, and said input shaft is so positioned as to penetrate through said lower end wall;

said output shaft is supported at an upper portion in said housing via a bearing means so as to rotate and is so positioned as to penetrate through said upper end wall, said pinion gear is disposed above said upper end wall, and an oil seal is interposed between said output shaft and said upper end wall;

said input shaft is supported by said lower end wall via a bearing means so as to rotate;

the drain chamber in said case of said hydraulic motor is communicated with the interior of said housing via a fluid passage means; and the upper end of said housing is communicated with said operation fluid tank via a return fluid passage that includes an oil filter.

2. A carrier vehicle according to claim 1, wherein:

an oil seal is interposed between said input shaft and said lower end wall under said bearing means that supports said input shaft, said oil seal having a communication hole penetrating therethrough in the up-and-down direction;

said case of said hydraulic motor has an upper end wall, said hydraulic motor has a drive shaft which is so positioned as to penetrate through said upper end wall and is supported by said upper end wall via a bearing means to rotate, the upper end of said drive shaft being drivably coupled to the lower end of said input shaft; and said fluid passage means includes said bearing means for supporting said input shaft and said output shaft, as well as said communication hole formed in said oil seal.

3. A carrier vehicle according to claim 1, wherein:

an oil filter is interposed between said input shaft and said lower end wall under said bearing means that supports said input shaft;

said case of said hydraulic motor has the upper end wall, said hydraulic motor has a drive shaft which is so positioned as to penetrate through said upper end wall and is supported by said upper end wall via bearing means so as to rotate, the upper end of said drive shaft being drivably coupled to the lower end of said input shaft; and said fluid passage means includes said bearing means that support said input shaft and said output shaft, as well as said oil filter.

4. A carrier vehicle according to claim 1, wherein:

a first oil seal is interposed between said input shaft and said lower end wall under said bearing means that supports said input shaft;

said case of said hydraulic motor has an upper end wall, said hydraulic motor has a drive shaft which is so positioned as to penetrate through said upper end wall and is supported by said upper end wall via a bearing means so as to rotate, upper end of said drive shaft being drivably coupled to the lower end of said input shaft, and a second oil seal is interposed between said drive shaft above said bearing means which supports said drive shaft and said upper end wall;

an annular fluid chamber is formed between said upper end wall and the outer peripheral surface of said drive shaft which is located between said bearing means supporting said drive shaft and said second oil seal, and a first fluid hole is formed in said upper end wall, one end of said first fluid hole opening in said fluid chamber and the other end of said first fluid hole opening on the outside of said case;

a second fluid hole is formed in said lower end wall of said housing, one end of said second fluid hole opening in said housing and the other end of said second fluid hole opening on the outside of said housing, said first fluid hole and said second fluid hole are connected together via a fluid pipe arranged on the outside of said casing and said housing, and an oil filter is arranged in said fluid pipe; and said fluid passage means includes said first fluid hole, said fluid pipe that includes said oil filter, and said second fluid hole.

* * * * *